US009552507B2

(12) United States Patent
Shearin et al.

(10) Patent No.: US 9,552,507 B2
(45) Date of Patent: Jan. 24, 2017

(54) SYSTEM AND METHOD FOR READING OPTICAL CODES ON BOTTOM SURFACE OF ITEMS

(71) Applicant: Datalogic ADC, Inc., Eugene, OR (US)

(72) Inventors: Alan Shearin, Eugene, OR (US);
WenLiang Gao, Eugene, OR (US);
Bryan L. Olmstead, Eugene, OR (US)

(73) Assignee: Datalogic USA, Inc., Eugene, OR (US)

( * ) Notice: Subject to any disclaimer, the term of this patent is extended or adjusted under 35 U.S.C. 154(b) by 547 days.

(21) Appl. No.: 13/875,243

(22) Filed: May 1, 2013

(65) Prior Publication Data
US 2013/0292470 A1 Nov. 7, 2013

Related U.S. Application Data

(60) Provisional application No. 61/643,820, filed on May 7, 2012.

(51) Int. Cl.
*G06K 7/14* (2006.01)
*G06K 5/00* (2006.01)
*G06K 7/10* (2006.01)

(52) U.S. Cl.
CPC ............ *G06K 7/1465* (2013.01); *G06K 5/00* (2013.01); *G06K 7/1096* (2013.01); *G06K 7/10722* (2013.01); *G06K 7/10732* (2013.01); *G06K 7/10861* (2013.01); *G06K 7/1491* (2013.01)

(58) Field of Classification Search
USPC ..................................................... 235/437
See application file for complete search history.

(56) References Cited

U.S. PATENT DOCUMENTS

| 5,446,271 | A | * | 8/1995 | Cherry | G06K 7/10861 235/462.1 |
|---|---|---|---|---|---|
| 5,635,699 | A | | 6/1997 | Actis et al. | |
| 5,984,186 | A | | 11/1999 | Tafoya | |
| 6,107,921 | A | | 8/2000 | Eberhardt et al. | |
| 6,142,376 | A | | 11/2000 | Actis et al. | |

(Continued)

OTHER PUBLICATIONS

Korean Intellectual Property Office, International Search Report and Written Opinion, International Patent Application No. PCT/US2013/039925, dated May 7, 2013, 13 pages.

(Continued)

*Primary Examiner* — Michael G Lee
*Assistant Examiner* — David Tardif
(74) *Attorney, Agent, or Firm* — Stoel Rives LLP

(57) ABSTRACT

An automated checkout system and method of operation for reading encoded data on a bottom surface of an item using a data reader. The automated checkout system includes a leading conveyor section and a trailing conveyor section separated by a gap therebetween, where the item is transported across the gap as it moves between the conveyors. A first and second reading device are each positioned beneath the conveyor sections, where each reading device has a field of view projecting through the gap. The first reading device is configured to acquire a first set of scan data and the second reading device is configured to acquire a second set of scan data different from the first. In some embodiments, the first set of scan data may include two-dimensional area views of the encoded data, and the second set of scan data may include linescans of the encoded data.

17 Claims, 6 Drawing Sheets

(56) References Cited

U.S. PATENT DOCUMENTS

| | | |
|---|---|---|
| 6,220,911 B1 | 4/2001 | Kim |
| 6,431,450 B1 | 8/2002 | Lundahl et al. |
| 7,658,291 B2 | 2/2010 | Valerio |
| 2002/0014533 A1* | 2/2002 | Zhu .................. B82Y 15/00 235/472.01 |
| 2006/0278708 A1 | 12/2006 | Olmstead |
| 2009/0134221 A1* | 5/2009 | Zhu .................. A47F 9/046 235/383 |
| 2009/0288917 A1 | 11/2009 | Sato |
| 2010/0163627 A1 | 7/2010 | Olmstead |
| 2012/0187195 A1 | 7/2012 | Actis et al. |
| 2012/0205448 A1 | 8/2012 | Hoskinson et al. |
| 2013/0020391 A1 | 1/2013 | Olmstead et al. |
| 2013/0020392 A1 | 1/2013 | Olmstead et al. |

OTHER PUBLICATIONS

European Patent Office, Supplementary European Search Report, Nov. 23, 2015, 7 pp.

\* cited by examiner

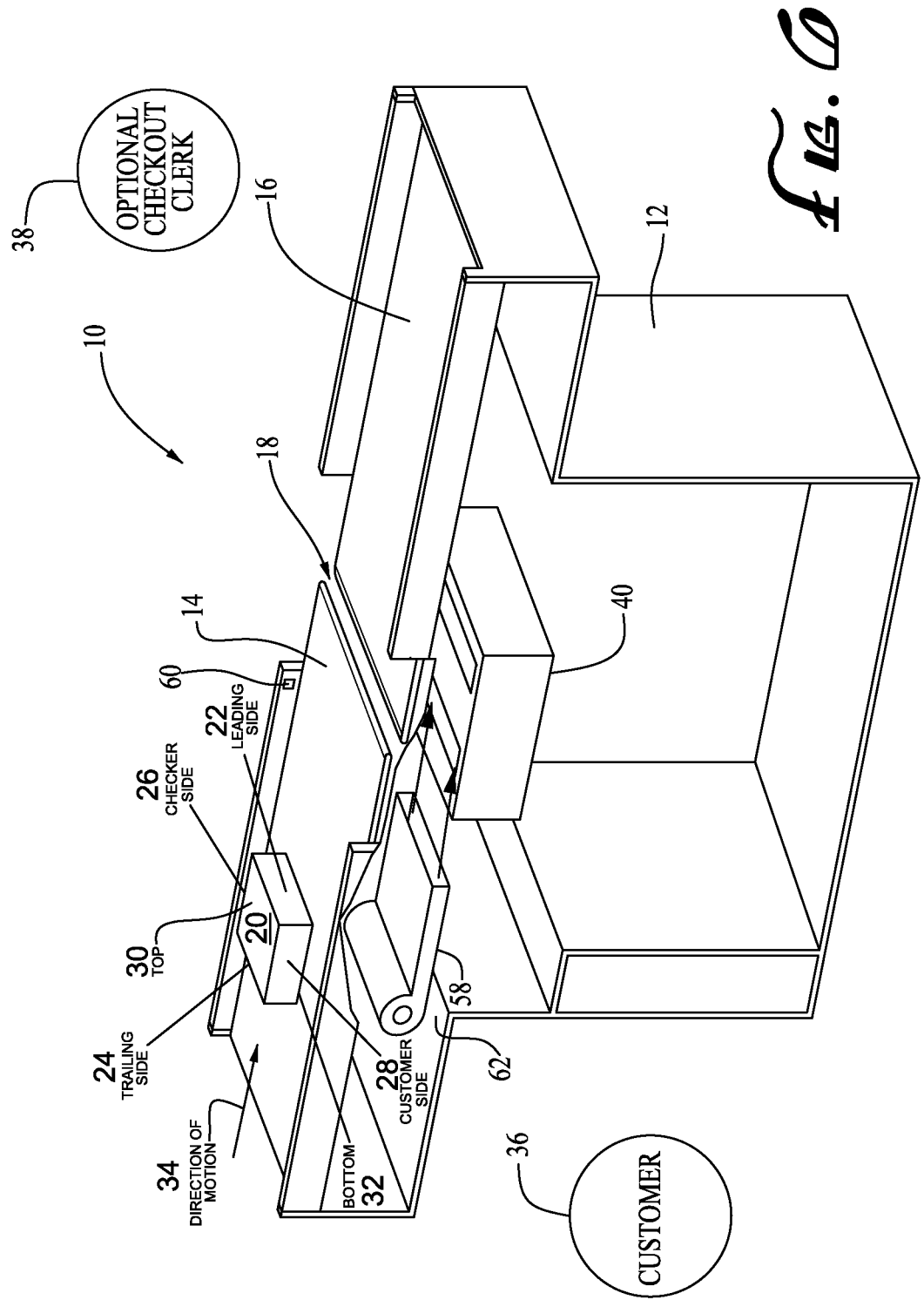

SYSTEM AND METHOD FOR READING OPTICAL CODES ON BOTTOM SURFACE OF ITEMS

RELATED APPLICATION DATA

This application is a nonprovisional of and claims the benefit under 35 U.S.C. §119(e) from U.S. Provisional Patent Application No. 61/643,820, filed May 7, 2012, the disclosure of which is incorporated by reference herein in its entirety.

BACKGROUND

The field of this disclosure relates generally to systems and methods for item checkout, and more particularly, to checkout systems having a data reader capable of reading encoded data on a bottom surface of the item as the item passes through a read region of the data reader.

Data reading devices are used to read optical codes, acquire data, and capture a variety of images. Optical codes typically comprise a pattern of dark elements and light spaces. There are various types of optical codes, including one-dimensional codes, such as a Universal Product Code ("UPC") and EAN/JAN codes, and stacked and two-dimensional codes, such as PDF417 and Maxicode codes.

Data reading devices are well known for reading UPC and other types of optical codes on packages, particularly in retail stores. Some data readers are installed at checkout stands or are built into a horizontal checkout counter so that a read region is projected through a transparent window to read the optical code on the package. In a fully automated system, a customer normally places items on a counter, a deck, or a conveyor and the items are conveyed by the conveyor or other means through the read region. In a semi-automatic system, a checkout clerk takes each item and moves it through the read region where the data reader captures the optical code.

One common data reader in such systems is an imaging reader that employs an imaging device or sensor array, such as a CCD (charge coupled device) imager or CMOS (complementary metal oxide semiconductor) imager. Imaging readers can be configured to read both 1-D and 2-D optical codes, as well as other types of optical codes or symbols and images of other items. Though some imaging readers are capable of using ambient light illumination, an imaging reader typically utilizes a light source to illuminate the item being read to provide the required signal response in the imaging device. An imager-based reader utilizes a camera or imager to generate electronic image data, typically in digital form, of an optical code. The image data is then processed to find and decode the optical code.

In one arrangement, the imaging reader may include one or more cameras operating in a linescan mode and configured to capture a series of single line views or scan lines of the optical code as the code crosses a read region. Multiple single line views of linescan mode may be combined to produce a raster image of the code, which is thereafter processed to decode the optical code. In another arrangement, the imaging reader may include one or more cameras operating in an area mode to capture a set of area views of the optical code as the code crosses the read region. The area views may thereafter be stitched together to produce a two-dimensional image that includes a complete image of the optical code. The image may thereafter be processed to decode the optical code.

In some embodiments of a checkout system, the read region for the imaging readers may be defined by a gap that separates two conveying elements (e.g., conveyor belts). In such embodiments, the imaging readers may be positioned beneath the conveying elements and positioned so that the field of view projects through the gap and allows the imaging readers to capture the optical code from the item as the item crosses the gap.

The present inventors have recognized certain limitations with present checkout systems. Certain checkout systems either cannot read or may have difficulty accurately capturing optical codes located on a conveyor-contacting, bottom surface of the item because the optical code is blocked from view. Consequently, a checkout clerk or customer has to remove the item from the conveyor and reposition it so that the optical code is not on the bottom surface. In some cases, manual processing of items may be necessary, which leads to inefficiencies such as increases in item processing time.

The present inventors have also recognized certain disadvantages associated with tunnel scanners that use imagers operating exclusively in either linescan mode or area mode to capture optical data on the bottom surface of the item. For instance, imagers operating in linescan mode require the item to move substantially uniformly across the read region to acquire a decodable image. Erratic motion or wobbling of the item as it crosses the read region may result in the data reader acquiring a distorted image of the optical code, which may prevent accurate decoding of the optical code. This issue with motion of the item is exacerbated in tunnel scanning systems where the read region is defined by a small gap separating two conveying elements, since items tend to wobble as they traverse the gap.

On the other hand, while imagers operating in an area mode usually have few issues handling erratic motion of items, such imagers have other disadvantages. For instance, area views typically require a large read region to ensure that a sufficiently large portion of the optical code is captured. However, in systems where the read region is defined by the width of the gap between conveying elements, it may be difficult to accommodate the larger read region while avoiding undesirable consequences. For instance, widening the gap to create a larger read region may lead to issues with items becoming lodged in or falling through the gap, or allowing dirt, dust, or other debris to interfere with the data readers.

The present inventors have, therefore, determined that it would be desirable to provide an improved imager-based reader and an improved tunnel or portal scanner system for automated checkout. Additional aspects and advantages will be apparent from the following detailed description of preferred embodiments, which proceeds with reference to the accompanying drawings.

BRIEF DESCRIPTION OF THE DRAWINGS

FIG. 6 is a simplified illustration of an alternative embodiment for an automated checkout system with the leading and trailing conveyors vertically offset from one another.

DETAILED DESCRIPTION OF PREFERRED EMBODIMENTS

With reference to the drawings, this section describes particular embodiments and their detailed construction and operation. The embodiments described herein are set forth by way of illustration only and not limitation. The described features, structures, characteristics, and methods of operation may be combined in any suitable manner in one or more embodiments. In view of the disclosure herein, those skilled in the art will recognize that the various embodiments can be practiced without one or more of the specific details or with other methods, components, materials, or the like. In other instances, well-known structures, materials, or methods of operation are not shown or not described in detail to avoid obscuring more pertinent aspects of the embodiments.

In the following description of the figures and any example embodiments, it should be understood that an automated checkout system in a retail establishment is merely one use for such a system and should not be considered as limiting. Other uses for an automated checkout system with the characteristics and features described herein may be possible, for example, in an industrial location such as a parcel distribution (e.g., postal) station.

Figure 1:
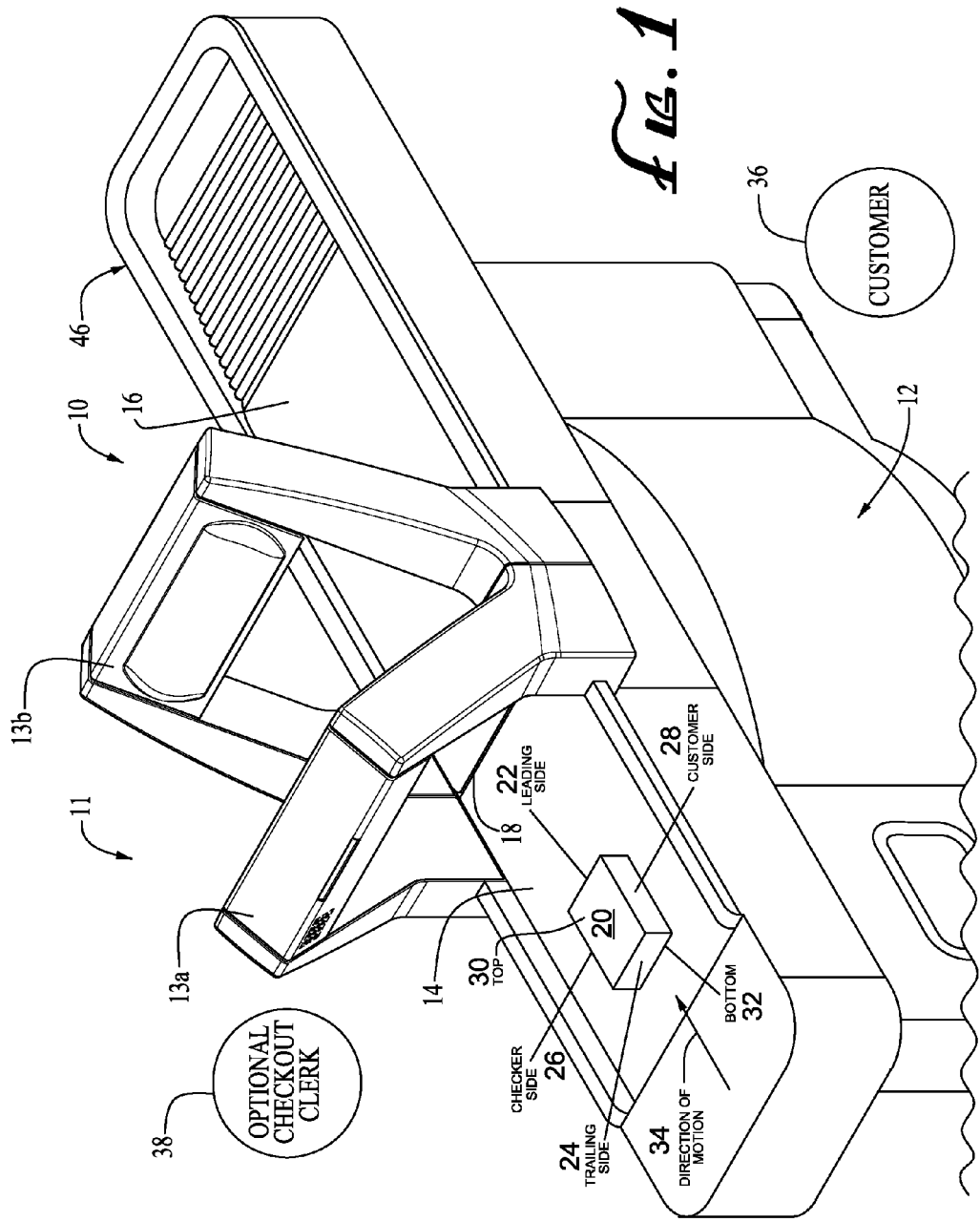
FIG. 1 is an isometric view of an automated checkout system, according to a first embodiment, with leading and trailing conveyor sections and an exemplary six-sided, box-shaped item located on the leading conveyor section and being moved toward a tunnel or portal scanner data capture device.
Figure 2:
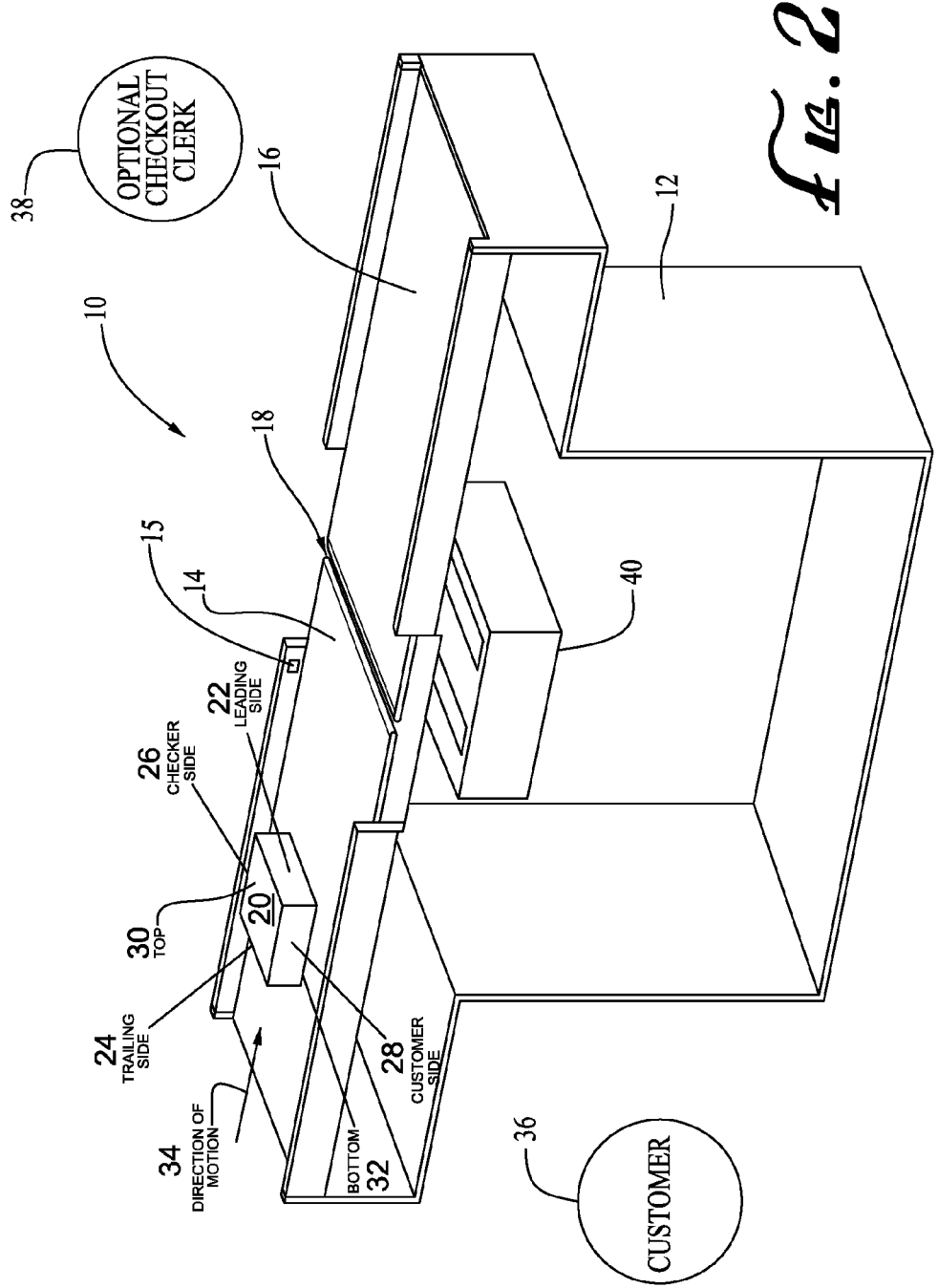
FIG. 2 is a simplified illustration of the automated checkout system of FIG. 1 showing a data reader positioned beneath the conveyors on an interior portion of a housing structure for the automated checkout system, with the upper portion of the tunnel scanner removed.
Figure 3:
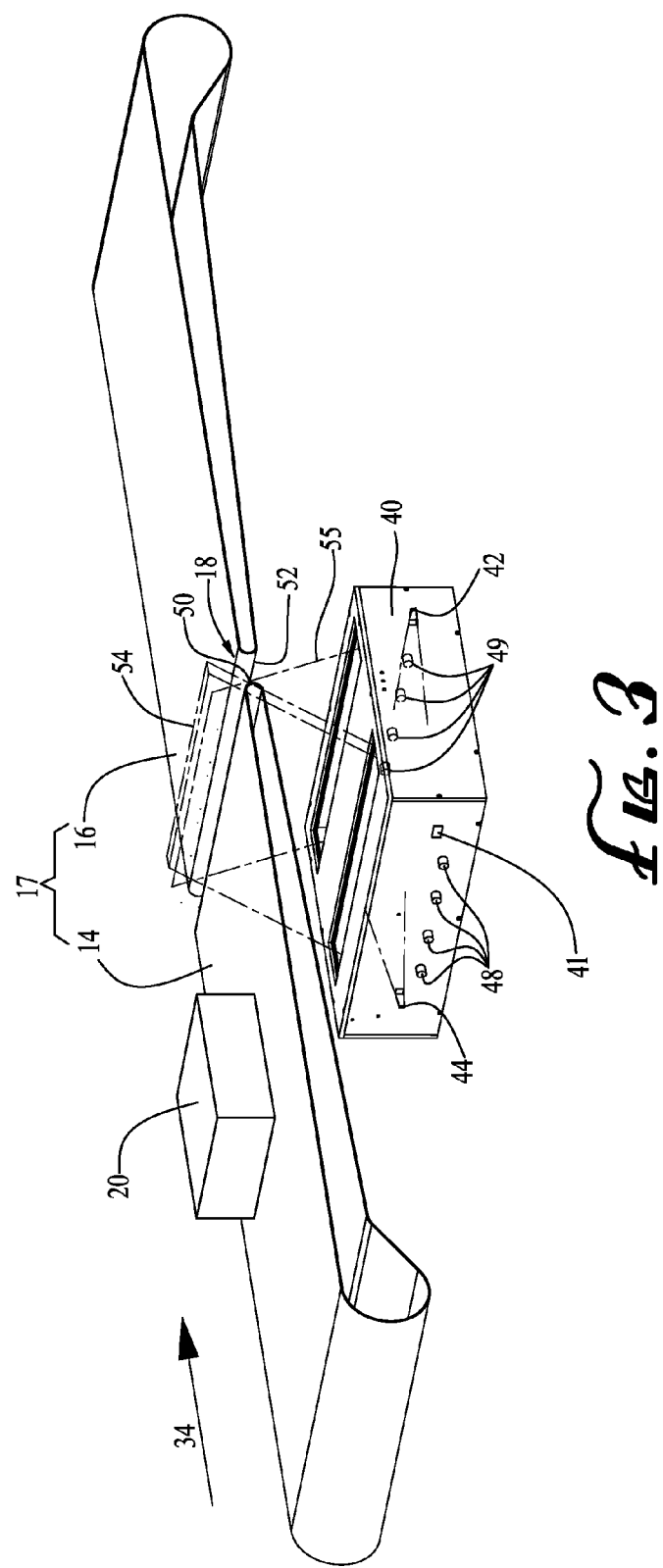
FIG. 3 is a simplified illustration of the automated checkout system of FIG. 1 illustrating the data reader having a dual camera system and multiple illumination sources.

FIGS. 1-3 collectively illustrate a first embodiment of an automated checkout system 10. In one example operation, automated checkout system 10 may be used to read and process an optical code on a bottom surface 32 of an item 20 during a checkout process, such as in a retail establishment or supermarket. In an example operation, a customer 36 or clerk 38 (hereinafter, collectively referred to as a "user") places item 20 onto a leading conveyor section 14 that transports item 20 in a substantially linear direction of motion 34 toward a trailing conveyor section 16. For convenience, leading and trailing conveyor sections 14, 16 may collectively be referred to as conveyor 17 in the following description.

Leading conveyor section 14 is spaced apart from trailing conveyor section 16 by an elongated gap 18 that is oriented generally transverse to the substantially linear direction of motion 34. A bottom data reader 40 is positioned below conveyor 17 and oriented to project a field of view upwardly through gap 18. Data reader 40 is operable to capture the entire barcode label as the item 20 completes its transition across gap 18. Item 20 is then transported on trailing conveyor section 16 to a bagging area 46 where the user or other person can bag item 20. Further details of an example tunnel scanner, including a bottom data reader, are disclosed in U.S. application Ser. No. 13/356,417, filed Jan. 23, 2012 (and published as U.S. Pub. No. 2012/0187195), and U.S. application Ser. No. 13/357,356, filed Jan. 24, 2012 (and published as U.S. Pub. No. 2013/0020392), the disclosures of which are herein incorporated by reference.

With reference to FIGS. 1-3, automated checkout system 10 includes a housing structure 12 suitable for containing various components (as described below) of automated checkout system 10. Automated checkout system 10 may include a data capture device 11 having a first arch section 13a and a second arch section 13b coupled to housing structure 12. First and second arch sections 13a, 13b may include one or more data readers positioned therein for capturing various top and side views and reading barcode labels on item 20. Preferably, first arch section 13a is slanted forwardly in the direction of leading conveyor section 14 and second arch section 13b is slanted rearwardly in the direction of trailing conveyor section 16 such that first and second arch sections 13a, 13b form a generally V-shaped structure (e.g., as shown in FIG. 1).

Figure 4:
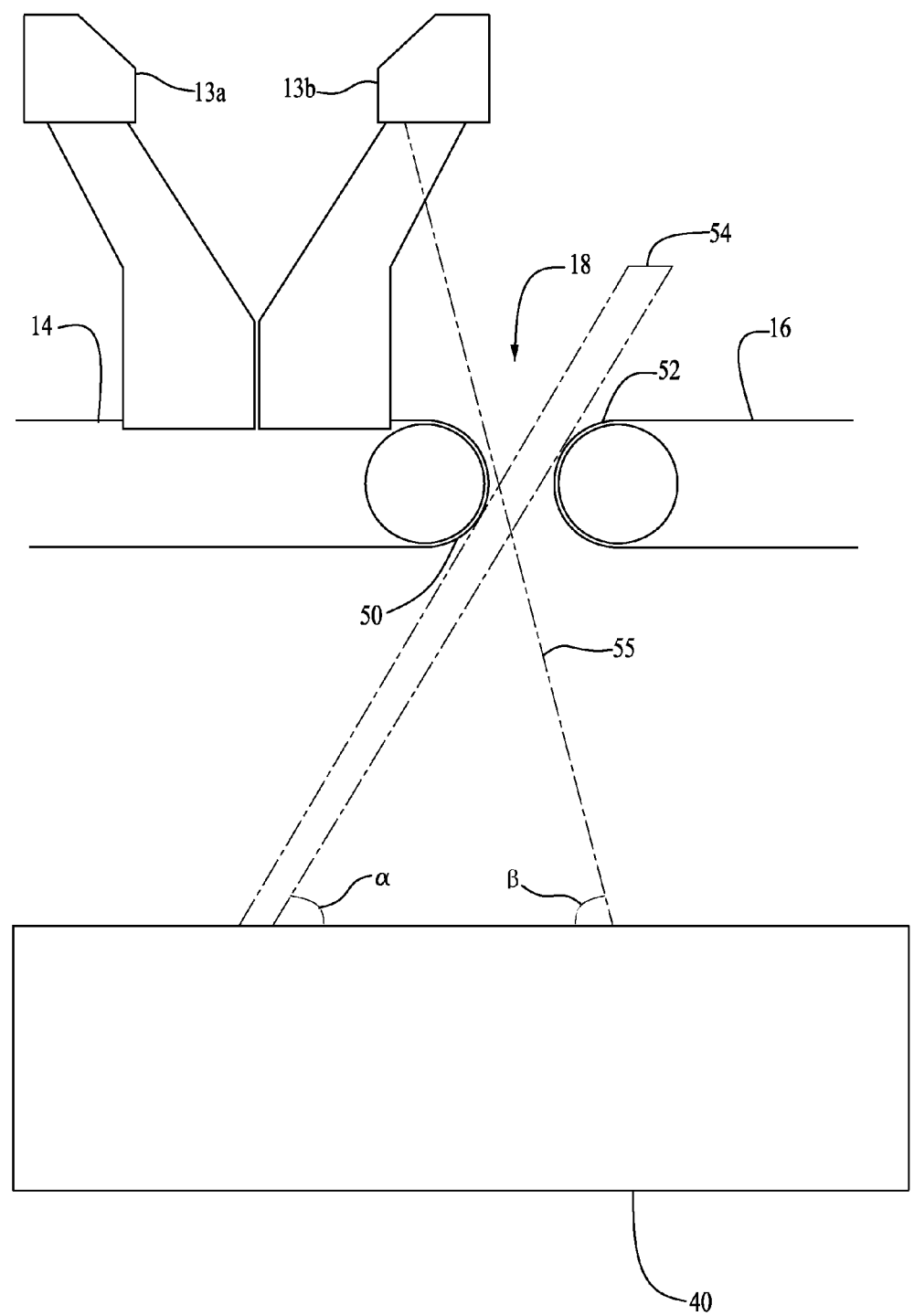
FIG. 4 is a simplified illustration of a side view of an alternative embodiment of an automated checkout system with the tunnel scanner positioned upstream of the gap, the system capturing a first view from one camera implemented as a linescan view and a second view from another camera implemented as an area view.

As mentioned previously, leading conveyor section 14 is separated from trailing conveyor section 16 by gap 18 of a suitable size, such as approximately twenty-five millimeters or less. Gap 18 extends along a length corresponding to the width of conveyors 14, 16. In some embodiments, gap 18 may be positioned between first arch 13a and second arch 13b, such as in a substantially central location of data capture device 11 as shown in FIG. 1. In other embodiments, gap 18 may be positioned upstream in relation to first arch 13a (i.e., a position where item 20 first crosses gap 18 and thereafter passes through arches 13a, 13b of data capture device 11) or downstream in relation to second arch 13b (i.e., a position where item 20 first passes through arches 13a, 13b of data capture device 11 and thereafter crosses gap 18 as illustrated in FIG. 4). Further details and advantages of such embodiments are disclosed in U.S. application Ser. No. 13/357,459, filed Jan. 24, 2012 (and published as U.S. Pub. No. 2013/0020391, the disclosure of which is herein incorporated by reference.

In some embodiments, the size of gap 18 may vary depending on many factors, such as, the intended use of automated checkout system 10. For instance, a retail establishment that processes items of various sizes may want to keep gap 18 fairly small (e.g., on the order of less than ten millimeters) to accommodate the many thinner items, such as gift cards or greeting cards, and prevent those items from becoming lodged in or falling through gap 18. A warehouse, on the other hand, dealing primarily with larger packages can have a larger gap 18 (e.g., on the order of ten millimeters or more) without concern that the packages will fall through or become lodged.

In some embodiments, automated checkout system 10 may include a transfer plate (not shown) positioned at least partially across gap 18 for helping item 20 transition between sections of conveyor 17. Depending on the size of gap 18 and the dimensions of item 20, transition between sections of conveyor 17 may be difficult for some items, as they may become lodged in or perhaps fall through gap 18. The transfer plate may be entirely comprised of a substantially transparent material, such as glass or other suitable material, through which data reader 40 can read the optical code on item 20. Additional details and embodiments for automated checkout systems using a transfer plate or other transitioning structure are disclosed in U.S. patent application Ser. No. 13/356,417, previously incorporated by reference.

It should also be noted that although the embodiment in FIG. 1 illustrates an open space between first and second arches 13a, 13b, arches 13a, 13b may be embodied in a single elongated tunnel formed over or around conveyor 17.

Automated checkout system 10 may thus be partially open and partially enclosed, such as the example illustrated in FIG. 1, or fully enclosed such as via a tunnel enclosure. The configuration of first and second arches 13a, 13b creates an open architecture that provides some barrier/inhibition from a customer reaching into the read region, while also providing sight lines for allowing the customer to generally continuously observe items passing through arches 13a, 13b. A tunnel or portal scanner need not include any fully enclosed tunnel structure or even semi-enclosed arches, but a suitable tunnel scanner may be constructed with more or less openness between arches 13a, 13b.

In one embodiment, conveyor 17 is oriented and configured to transport item 20, represented in FIG. 1 as a six-sided, box-shaped package having a leading side 22, a trailing side 24, a checker side 26, a customer side 28, a top surface 30, and a bottom surface 32, through automated checkout system 10 in a substantially linear direction of motion 34. The description regarding checker side 26 and customer side 28 is meant to facilitate description and establish a frame of reference related to the position of a customer 36 and a checkout clerk 38, as illustrated in FIG. 1. This description is not intended to be limiting. It should be understood that automated checkout system 10 may be used without checkout clerk 38, and customer 36 (or clerk 38) may be positioned at either side of automated checkout system 10. For convenience, item 20 is described as a box-shaped package, but it should be understood that item 20 may encompass other shapes, including irregularly shaped packages, such as a bag of oranges, potato chips, or the like. Additionally, although item 20 may contain an optical code on any one or more of the six sides 22, 24, 26, 28, 30, and 32 described herein, for purposes of discussion, the optical code will be described with reference to its affixation on bottom surface 32 (i.e., the conveyor-contacting surface).

In another embodiment, conveyor 17 may have a different directional orientation, such as a semi-circular configuration wrapping around customer 36 or checkout clerk 38. In such a configuration, each section of conveyor sections 14, 16 may each have a curved portion and a straightened end. The straightened end of leading conveyor section 14 may be substantially aligned with the straightened end of trailing conveyor section 16, and the respective straightened ends of the conveyors 14, 16 may be separated by gap 18. The operation regarding the processing and reading of item 20 may be substantially the same as described with respect to an embodiment where conveyor 17 is disposed along a substantially longitudinal axis.

With reference to FIGS. 2-5, automated checkout system 10 further includes a bottom data reader 40 that may be positioned at least fifty millimeters below conveyors 14, 16 and housed in housing structure 12. It should be understood that the following is a simplified description of certain components of data reader 40 and may not include details relating to a particular arrangement of optical elements, mirror sets, and other related features. In some embodiments, data reader 40 may include an optical arrangement and other features similar to the data reader described in U.S. patent application Ser. No. 13/357,356, filed Jan. 24, 2012, the disclosure of which is herein incorporated by reference. In another embodiment, components of data reader 40 may be constructed and arranged in a pull-out drawer subhousing within housing structure 12, such as described in U.S. application Ser. No. 13/454,377, filed Apr. 24, 2012 (and published as U.S. Pub. No. 2012/0205448), the disclosure of which is incorporated by reference herein.

Data reader 40 includes a first and second camera 42, 44 facing in opposite directions to acquire the optical code from item 20 as item 20 crosses gap 18. First camera 42 may be oriented to capture the downstream or trailing view (i.e., the view facing toward trailing conveyor section 16) and configured in an area mode to acquire one or more two-dimensional area views 54 of the optical code as it is exposed when item 20 crosses the gap 18 (i.e., the read region). In an area mode, first camera 42 acquires an image of a portion or all of the read region at a given time point, such as by using a global shutter imager. These area images may thereafter be stitched or pieced together (see FIG. 5 and related discussion) to produce a complete image of bottom surface 32 of item 20, which includes the optical code. Since the motion of item 20 is essentially frozen during the capture or acquisition of an area image, a camera set on area view 54 to capture optical codes avoids issues with wobbling or oddly-shaped items 20. Additional details and embodiments relating to cameras operating in area mode are disclosed in U.S. application Ser. No. 12/646,755, filed Dec. 23, 2009 (and published as U.S. Pub. No. 2010/0163627), the disclosure of which is herein incorporated by reference.

Second camera 44 may be oriented to capture the upstream or leading view (i.e., the view facing toward leading conveyor section 14) and configured to capture images in linescan mode. In linescan mode, second camera 44 acquires one or more single line views 55 of at least a portion of the encoded data as item 20 passes through the gap 18. These single line views 55, in combination with the motion of item 20, may thereafter be processed, such as through an image stitching process, to create a composite image of the entire bottom surface 32 of item 20, including the optical code. One example method for capturing and processing scan lines is disclosed in U.S. application Ser. No. 13/357,356, previously incorporated by reference. In other embodiments, the linescan mode may be replaced by a laser raster scanning method as described in detail in U.S. application Ser. No. 11/279,365, filed Apr. 11, 2006 (and published as U.S. Pub. No. 2006/0278708), and U.S. Pat. No. 6,142,376, issued Nov. 7, 2000, the disclosures of which are herein incorporated by reference.

As briefly described above, first and second cameras 42, 44 are positioned beneath conveyor 17. In one embodiment, first camera 42 is positioned to acquire area views 54 of bottom surface 32 in the downstream or trailing direction. Second camera 44 is positioned to acquire linescan view 55 in the upstream or leading direction. In such configuration, the linescan view 55 is slanted or angled toward a conveyor end 50 of leading conveyor section 14. Similarly, the area view 54 is slanted or angled toward a conveyor end 52 of trailing conveyor section 16.

In other embodiments, the relative positions and orientations of first and second cameras 42, 44 may be different. For instance, first camera 42 may instead be oriented to acquire area views in the upstream direction and second camera 44 may instead be oriented to acquire linescan views in the downstream direction. It should be understood that reference to the positioning or use of two cameras (e.g., first and second cameras 42, 44) is for convenience only and not meant as limiting. In other embodiments, data reader 40 may include any number of cameras so that the data reader 40 can read the leading and trailing sides of the item 20. In addition, in other embodiments, cameras 42, 44 may be arranged as side-by-side within data reader 40 instead of facing in opposite directions.

With reference to FIG. 4, first and second cameras 42 may be positioned to provide an angled view through gap 18. For instance, first camera 42 may be positioned so that area view 54 reads through gap 18 at an angle α. Similarly, second camera 44 may be positioned so that linescan view 55 reads through gap 18 at an angle β. In some embodiments, angles α,β may each be approximately 30 degrees. In other embodiments, the angles α,β may be different from one another. For instance, in an embodiment where conveyor sections 14, 16 are offset from one another (e.g., as shown in FIG. 6), angle α may be smaller than angle β to ensure that both first and second cameras 42, 44 can read through gap 18.

Preferably, conveyor 17 operates at a constant speed, e.g., approximately 300 mm/s, to optimize the performance of data reader 40. To help monitor and regulate the conveyor speed, automated checkout system 10 may include a conveyor motion sensor 15 (diagrammatically shown in FIG. 1 near leading conveyor section 14, but it may be placed in any suitable location). Additionally, it is preferred that items 20 be placed on leading conveyor section 14 sequentially, in single file, to avoid data reader 40 mistakenly reading multiple items as a single item. In other embodiments, optimal performance of data reader 40 can be achieved with conveyor 17 operating at speeds higher or lower than 300 mm/s without departing from the principles of the embodiments described herein.

To aid in illuminating the optical code so that first and second cameras 42, 44 acquire accurate images, data reader 40 may also include a first illumination source 48 and a second illumination source 49. In some embodiments, first and second illumination sources 48, 49 comprise an array of four LEDs generally arranged in a linear fashion and configured to project illumination through gap 18 and onto leading side 22, trailing side 24, and bottom surface 32 of item 20 to illuminate the read region defined by the width and length of gap 18. The illumination intensity of first illumination source 48 may be identical to the intensity of second illumination source 49 or it may differ depending on the lighting needs of first and second cameras 42, 44.

Other numbers or arrangements of LEDs or other sources of illumination may also be suitable. For instance, in other embodiments, first and second illumination sources 48, 49 may not be housed within data reader 40, but may instead be supported or located on a separate structure of automated checkout stand 10 and oriented to illuminate gap 18 as described. In yet other embodiments, a controller may be in communication with first and second illumination sources 48, 49 and configured for selectively controlling operation of first and second illumination sources 48, 49. In still other embodiments, illumination sources 48, 49 may provide pulsed or continuous illumination.

In one embodiment, first illumination source 48 is arranged in an angular configuration to project illumination through gap 18 in a direction generally coincident with the field of view of first camera 42, that is, in a direction facing conveyor end 52 of trailing conveyor section 16. Similarly, second illumination source 49 is arranged in an angular configuration to project illumination through gap 18 in a direction generally coincident with the field of view of second camera 44, that is, in a direction facing conveyor end 50 of leading conveyor section 14.

In this configuration, when item 20 is not blocking the illumination of second illumination source 49 (i.e., when no item 20 is crossing gap 18), the illumination is directed toward and blocked by a portion of first and/or second arches 13a, 13b so that the illumination is out of the view of a human operator or a customer. Blocking some or all of the illumination from second illumination source 49 may be desirable because the illumination tends to be brighter than the corresponding illumination emitted from first illumination source 48. This disparity is due to the linescan operation of second camera 44 typically requiring higher light intensity than the area mode operation of first camera 42. Therefore, the more intense light would be blocked by the arches 13a, 13b and only the dimmer light from first illumination source 48 may be in view of a human operator or customer.

In some embodiments, data reader 40 may further include a processing unit 41 integrated therewith or as a separate unit in communication with data reader 40. Processing unit 41 is preferably configured for decoding the acquired optical codes from first and second cameras 42, 44 using standard image processing and stitching techniques. As a preliminary step, processing unit 41 may also determine whether either or both of cameras 42, 44 have captured a complete optical code. If neither cameras 42, 44 have captured the optical code, processing unit 41 may send a message to a display or other terminal alerting the user that the item may need reprocessing.

In instances where both cameras 42, 44 have captured the optical code, processing unit 41 may verify the accuracy of the system by comparing the decoded optical code as acquired by first camera 42 with the decoded optical code as acquired by second camera 44 to determine whether the decoded optical codes match. In most instances, the decoded optical codes should match since both cameras 42, 44 are capable of individually capturing an optical code from the bottom surface 32 of the item 20. Accordingly, this comparison step may serve as a diagnostic measure to determine whether automated checkout stand 10, or whether one or both cameras 42, 44 are in proper working order.

However, in many cases, at least one of the cameras 42, 44 may not fully or correctly acquire the optical code from item 20. For instance, when item 20 is wobbling or shaking, second camera 44 operating in linescan mode may acquire an incomplete or a partially illegible optical code. When processing unit 41 compares the results of the cameras 42, 44, the decoded optical codes may not match. Accordingly, processing unit 41 may include a routine or diagnostic tool for first determining whether the cameras 42, 44 captured a complete optical code prior to comparing the decoded optical codes. This preliminary step would avoid processing unit 41 from alerting the user that one or more components are malfunctioning simply because the decoded optical codes did not match.

In an example operation, item 20 bearing an optical code on bottom surface 32 is initially placed on leading conveyor section 14 and transported in the direction of motion 34 toward gap 18. As item 20 transitions from leading conveyor section 14 across gap 18, the second illumination source 49 projects illumination onto bottom surface 32 to aid the second camera 44 in acquiring a number of linescan views 55 as item 20 crosses gap 18. Each of these views may be stored in a memory module of data reader 40 or stored in a remote memory module for subsequent processing and decoding. As item 20 continues across gap 18, first illumination source 48 projects illumination onto the bottom surface 32 to aid first camera 42 in acquiring one or more area views 54 of the same optical code. These images may be stored in the same or a different memory module as the linescan views 55 of second camera 44. Thus, for every item 20, both cameras 42, 44 will attempt to acquire images of bottom surface 32 so that both area views 54 and linescan views 55 are acquired. Thereafter, item 20 is transported on trailing conveyor section 16 to a bagging area 46 or another area.

Once the views 54, 55 have been acquired, processing unit 41 may first stitch all the frames together for each of the linescan views and area views corresponding to item 20. Since gap 18 is relatively narrow, both the area views 54 and linescan views 55 will likely need to be stitched or otherwise processed (see FIG. 5). Once the stitching process is complete, processing unit 41 may decode the optical codes.

Figure 5:
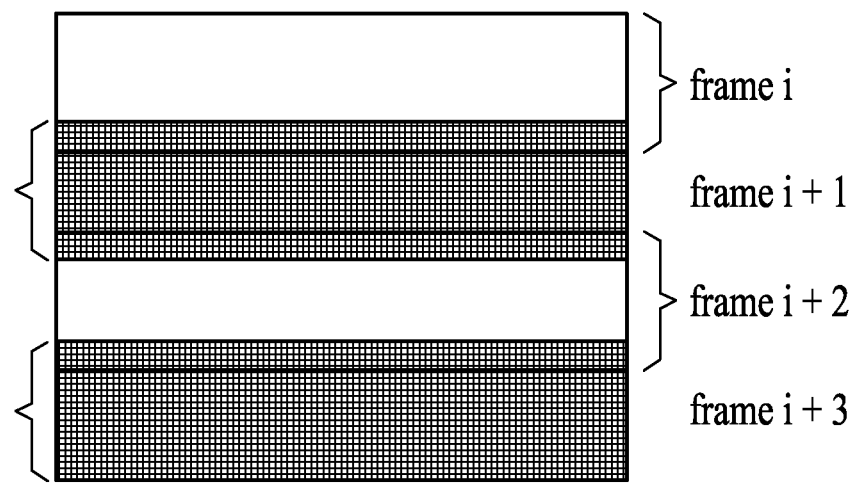
FIG. 5 is a schematic diagram illustrating a concept for stitching a plurality of frames of image data to reconstruct the image.

FIG. 5 is a schematic diagram illustrating a concept for stitching frames of image data. With reference to FIG. 5, one possible method for image stitching and decoding linescan views or area views may include overlaying the frames with the code portions and comparing overlapping features of the frames to recreate the entire optical code. For instance, the data reader (e.g., data reader 40) may capture a first frame of the target data, such as frame i, at a frame rate of approximately 130 frames per second and determine whether frame i includes a portion of the optical code containing a start sequence. The start sequence signals that the following frames will contain valid optical data and so the data reader will continue capturing the ensuing frames. Assuming frame i includes the start sequence, the subsequent frame captured, frame i+1, will typically contain a portion of an image that correlates or overlaps with a portion of the image in frame i and also contain new data not included in the prior frame. The data reader will continue gathering frames, such as frames i+2 and i+3, until it reads a valid stop sequence contained in one of the frames. Once the valid stop sequence is captured, the data reader, or a separate processing system such as a computer, may then stitch together the captured views of the individual frames to recreate the optical code. It should be understood that the described method is simply one of a number of methods that may be used to stitch frames together to recreate a complete image.

After the images have been stitched together to reconstruct the entire optical code, the processing unit decodes the optical code as acquired by the data reader (i.e., by the individual imaging cameras). In cases where two or more cameras acquired an optical code, the processing unit may compare the resulting codes and determine whether the decoded codes match. In instances where only one of the two cameras acquired a complete optical code, the system may be programmed to instruct the processing unit to consider the complete optical code as the correct code for the item 20.

In other embodiments, the image stitching process described above may instead be performed as a code stitching process where individually decoded fragments of the optical code are stitched together to form a complete, decoded optical code. For example, as described previously, the process may begin by capturing individual frames and determining whether the captured frame includes an optical code containing a start sequence. Thereafter, each subsequent frame will be captured until a valid stop sequence is read. Throughout the process, each of these captured frames (in either the area view or linescan view) should contain a portion of the optical code, which may be processed and decoded individually. Once all frames are analyzed in a similar fashion, each of the decoded code segments may be stitched together to recreate a complete and decoded optical code.

In some instances, image stitching may not be required. For instance, if the optical code is small enough or gap 18 large enough, first camera 42 may acquire an image of the entire optical code or enough of an optical code (such as a complete width of a one-dimensional optical code) in one frame. Similarly, second camera 44 may acquire the entire optical code or enough of the optical code (such as a single linescan traversing a one-dimensional optical code), in a single view or linescan. In such instances, processing unit 41 may skip the stitching process entirely and proceed with the decoding process.

As briefly described previously, one potential issue with acquiring optical codes using cameras implementing an area view is that the field of view is constricted by the relative narrowness (typically 25 mm or less) of gap 18. Because of this view constriction, a camera operating in area view may have difficulty reading and piecing together larger feature size barcodes. The area view 54 simply may not acquire large enough pieces of the barcode to be properly pieced together and then decoded. This difficulty is not so much of a problem for a camera operating in linescan mode because the linescan views generates a long raster view of arbitrary length that is able to encompass an arbitrarily long optical code.

However, one of the difficulties of using a camera operating in linescan mode is that the item typically must move substantially uniformly through the field of view or the resulting image may be distorted. In addition, if the optical code is in the ladder orientation (i.e., where the bars in the barcode are perpendicular to the object motion), the image distortion can prevent an accurate reading of the barcode. Thus, capturing images in linescan mode is a sensitive operation and typically requires more uniformity and control of the object motion as compared to area mode.

By using one camera implementing an area view and a second camera implementing a linescan view, automated checkout stand 10 is better able to capture a larger variety of optical codes and thereby reduce error rates associated with improperly captured or misread optical codes. Typically, both first and second cameras 42, 44 will accurately acquire and decode the optical codes. However, in instances where item 20 includes a large feature size label, the linescan view will likely be able to more accurately acquire and decode the optical codes. On the other hand, the area view is better suited for acquiring and decoding the optical codes on items 20 that are wobbling, shaking, or rolling as they cross the gap 18.

FIG. 6 illustrates an alternative embodiment of an automated checkout stand 10 where leading conveyor section 14 is raised in relation to trailing conveyor section 16 (i.e., the leading conveyor terminates at a raised elevation proximate and relative to the trailing conveyor). In this configuration, when item 20 transitions between leading conveyor section 14 to trailing conveyor section 16, item 20 crosses gap 18 and tilts or drops slightly onto trailing conveyor section 16. In such embodiments, cameras 42, 44 may have a different angle of view than the embodiment described in FIG. 1 to ensure that the area view of first camera 42 and the linescan view of second camera 44 captures the optical code through gap 18.

Preferably, first camera 42 and second camera 44 are oriented such that the linescan view 55 of second camera 44 is maintained in the upstream direction and area view 54 of first camera 42 is maintained in the downstream direction (see FIGS. 3 and 4). Such configuration would allow for the intense illumination associated with linescan view 55 to face in the direction of first and second arches 13*a*, 13*b* and out of view of the customer 36 or checkout clerk 38.

In some embodiments, automated checkout stand 10 may also include an air blower 58 positioned below conveyors 14, 16. Air blower 58 may direct air flow across data reader 40 to keep lint, dust, dirt, and other debris from collecting thereon and thereby helping improve the accuracy and performance of data reader 40. Additional details and advantages of such embodiments are disclosed in U.S. application Ser. No. 13/356,417, filed Jan. 23, 2012, previously incorporated by reference.

Automated checkout system 10 may further include sensor 60, such as an object sensor or a temperature sensor, for activating air blower 58 when item 20 triggers sensor 60 as it moves toward gap 18. It should be understood that object sensor 60 may be placed at any suitable location on automated checkout system 10. In some embodiments, sensor 60 or another sensor may also trigger activation of the first and second illumination sources 48, 49 to conserve energy use. For instance, when the sensor 60 is triggered, automated checkout stand 10 may determine an estimated time (based on the conveyor belt speed) for item 20 to arrive at gap 18, at which time the second illumination source 49 may be activated, followed by the first illumination source 48. Once item 20 has moved passed sensor 60, both illumination sources 48, 49 may be deactivated until sensor 60 is triggered again.

Although the description above contains much specificity, these details should not be construed as limiting the scope of the invention, but as merely providing illustrations of some embodiments of the invention. It should be understood that subject matter disclosed in one portion herein can be combined with the subject matter of one or more of other portions herein as long as such combinations are not mutually exclusive or inoperable.

The terms and descriptions used herein are set forth by way of illustration only and not meant as limitations. It will be obvious to those having skill in the art that many changes may be made to the details of the above-described embodiments without departing from the underlying principles of the inventions. The scope of the present invention should, therefore, be determined only by the following claims.

The invention claimed is:

1. An automated checkout system for reading encoded data from a bottom surface of an item, the automated checkout system comprising:
    a housing structure;
    a conveyor system comprising:
      (1) a leading conveyor section supported on the housing structure and operable to receive and transport the item bearing encoded data along a direction of motion, and
      (2) a trailing conveyor section supported on the housing structure and operable to receive and transport the item along the direction of motion, wherein the trailing conveyor section is spaced apart from the leading conveyor section by a gap, the gap being elongated in one direction and extending generally transverse to the direction of motion;
    a first reading device positioned beneath the conveyor system and configured for repeatedly reading through the gap, the first reading device having a first field of view oriented at a first angle relative to the direction of motion and facing the trailing conveyor section, the first reading device configured to acquire a first set of scan data of a trailing view of the item as the item transitions from the leading conveyor over the gap and onto the trailing conveyor section; and
    a second reading device positioned beneath the conveyor system and configured for repeatedly reading through the gap, the second reading device having a second field of view oriented at a second angle relative to the direction of motion and facing the leading conveyor section, the second reading device configured to acquire a second set of scan data different from the first set of scan data of a leading view of the item as the item transitions from the leading conveyor section over the gap, wherein the first angle of the first field of view is different than the second angle of the second field of view.

2. The automated checkout system of claim 1, wherein the first set of scan data comprises one or more two-dimensional area views of at least a portion of the encoded data as the item is transported across the first field of view.

3. The automated checkout system of claim 2, wherein the second set of scan data comprises one or more scan lines of at least a portion of the encoded data as the item is transported across the second field of view.

4. The automated checkout system of claim 1, further comprising:
    a first illumination source configured to project a first illumination through the gap and onto the bottom surface of the item to illuminate the first field of view and aid the first reading device in acquiring the first set of scan data; and
    a second illumination source configured to project a second illumination through the gap and onto the bottom surface of the item to illuminate the second field of view and aid the second reading device in acquiring the second set of scan data.

5. The automated checkout system of claim 1, further comprising a portal scanner having an arch section supported on the housing structure, the arch section positioned upstream of the gap such that the item is transported through the arch section prior to being transported across the gap.

6. The automated checkout system of claim 5, wherein the second illumination source is oriented to project the second illumination through the gap and onto a portion of the arch section such that the second illumination is blocked by the arch section so as to not interfere with a human operator.

7. The automated checkout system of claim 1, further comprising a processor in communication with the first and second reading devices, the processor configured to process and decode the first set of scan data to generate a first decoded optical code and the second set of scan data to generate a second decoded optical code.

8. The automated checkout system of claim 7, wherein the processor configured to process and decode the first and second set of scan data further includes the processor configured to stitch data of the first set of scan data to generate the first decoded optical code and to stitch data of the second set of scan data to generate the second decoded optical code.

9. The automated checkout system of claim 8, wherein the processor is further configured to:
    compare the first decoded optical code to the second decoded optical code; and
    determine whether the first and second decoded optical codes match.

10. A method for reading an optical code using a data reading system, the method comprising:
    receiving on a leading conveyor section an item bearing encoded data;
    transporting the item along a direction a motion on the leading conveyor section across a gap and onto a trailing conveyor section, wherein the gap is elongated in one direction and extends generally transverse to the item direction of motion;

reading with a first reading device through the gap along a first field of view oriented at a first angle relative to the direction of motion and facing the trailing conveyor section;

acquiring, in combination with movement of the item across the gap, a first set of scan data of a trailing view of the item as the item transitions from the leading conveyor over the gap and onto the trailing conveyor section with the first reading device;

reading with a second reading device through the gap along a second field of view oriented at a second angle relative to the direction of motion and facing the leading conveyor section; and acquiring, in combination with movement of the item across the gap, a second set of scan data of a leading view of the item as the item transitions from the leading conveyor section over the gap with the second reading device, wherein the first set of scan data is different than the second set of scan data, and wherein the first angle of the first field of view is different from the second angle of the second field of view.

11. The method of claim 10, wherein the first set of scan data comprises one or more two-dimensional area views of at least a portion of the encoded data as the item is transported across the first field of view.

12. The method of claim 11, wherein the second set of scan data comprises one or more scan lines of at least a portion of the encoded data as the item is transported across the second field of view.

13. The method of claim 10, further comprising:
illuminating the first field of view with illumination from a first illumination source to aid the first reading device in acquiring the first set of scan data; and
illuminating the second field of view with illumination from a second illumination source to aid the second reading device in acquiring the second set of scan data.

14. The method of claim 13, wherein the data reading system comprises a portal scanner having an arch section, the method further comprising:
projecting the second illumination source through the gap and onto the arch section of the portal scanner such that illumination from the second illumination source does not interfere with a human operator.

15. The method of claim 10, further comprising:
processing, via a processor in communication with the first and second reading devices, the first and second sets of scan data; and
generating a first decoded optical code from the first set of scan data and a second decoded optical code from the second set of scan data.

16. The method of claim 15, further comprising comparing the first decoded optical code to the second decoded optical code and determining whether the first and second optical codes match.

17. The method of claim 16, further comprising stitching data of the first set of scan data to generate the first decoded optical code and stitching data of the second set of scan data to generate the second decoded optical code.

* * * * *

UNITED STATES PATENT AND TRADEMARK OFFICE
CERTIFICATE OF CORRECTION

| | | |
|---|---|---|
| PATENT NO. | : 9,552,507 B2 | Page 1 of 1 |
| APPLICATION NO. | : 13/875243 | |
| DATED | : January 24, 2017 | |
| INVENTOR(S) | : Alan Shearin et al. | |

It is certified that error appears in the above-identified patent and that said Letters Patent is hereby corrected as shown below:

In the Specification

In Column 6, Line 66, please replace "first and second cameras 42" with --first and second cameras 42, 44--.

In Column 8, Line 17, please replace "have captured" with --has captured--.

In Column 10, Line 16, please replace "generates" with --generate--.

In Column 10, Line 53, please replace "captures the" with --capture the--.

In the Claims

In Column 11, Line 60, please replace "conveyor over" with --conveyor section over--.

In Column 12, Line 63, please replace "direction a motion" with --direction of motion--.

In Column 13, Line 8, please replace "conveyor over" with --conveyor section over--.

Signed and Sealed this
Seventh Day of March, 2017

Michelle K. Lee
*Director of the United States Patent and Trademark Office*